US012138819B2

(12) United States Patent
Penazzi et al.

(10) Patent No.: US 12,138,819 B2
(45) Date of Patent: Nov. 12, 2024

(54) KNIFE FOR CUTTING CAPSULES

(71) Applicant: SACMI COOPERATIVA MECCANICI IMOLA SOCIETA' COOPERA, Imola (IT)

(72) Inventors: Davide Penazzi, Imola (IT); Matteo Venturini, Imola (IT)

(73) Assignee: Sacmi Cooperativa Meccanici Imola Societa' Coopera (IT)

( * ) Notice: Subject to any disclaimer, the term of this patent is extended or adjusted under 35 U.S.C. 154(b) by 0 days.

(21) Appl. No.: 17/912,671

(22) PCT Filed: Mar. 19, 2021

(86) PCT No.: PCT/IB2021/052304
§ 371 (c)(1),
(2) Date: Sep. 19, 2022

(87) PCT Pub. No.: WO2021/186403
PCT Pub. Date: Sep. 23, 2021

(65) Prior Publication Data

US 2023/0150163 A1 May 18, 2023

(30) Foreign Application Priority Data

Mar. 19, 2020 (IT) ........................ 102020000005920

(51) Int. Cl.
*B26F 1/22* (2006.01)

(52) U.S. Cl.
CPC ...................................... *B26F 1/22* (2013.01)

(58) Field of Classification Search
CPC .......................................................... B26F 1/22
USPC .................................................... 30/280–321
See application file for complete search history.

(56) References Cited

U.S. PATENT DOCUMENTS 4,955,138 A * 9/1990 Henke ..................... A47L 13/08 30/169
5,765,288 A * 6/1998 Hagler, Jr. .............. B26B 5/005 30/294
2004/0000059 A1 * 1/2004 Yu Chen ................... B26B 3/00 30/294
2013/0001185 A1 1/2013 Antier et al.
2016/0271823 A1 * 9/2016 Slovut .................... B26D 7/265
2017/0136712 A1 * 5/2017 Kagawa .................. B29C 59/04
2017/0362003 A1 12/2017 Maguire
(Continued)

FOREIGN PATENT DOCUMENTS

CN 102514807 A 6/2012
WO 2011064489 A1 6/2011

*Primary Examiner* — Adam J Eiseman
*Assistant Examiner* — Richard D Crosby, Jr.
(74) *Attorney, Agent, or Firm* — Laubscher & Fretwell

(57) ABSTRACT

A knife for a cutting apparatus forms incision lines and cuts on a side wall of a capsule made of plastics intended to close a container and it is suitable for performing cuts and incisions when the capsule is rotated around a rotation axis and moved along a path to interact with the knife in an advancement direction. The knife includes a vertically stacked layered structure of cutting tools.

First and second spaced cutting tools form spaced circumferential cuts on the side wall and a third cutting tool arranged between the first and second cutting tools forms oblique cuts on the side wall defining connecting portions connecting the tamper ring and the side wall.

23 Claims, 12 Drawing Sheets

(56) References Cited

U.S. PATENT DOCUMENTS

| | | | | |
|---|---|---|---|---|
| 2018/0370701 | A1 * | 12/2018 | Maguire ................ | B65D 41/04 |
| 2021/0094736 | A1 * | 4/2021 | Maguire ................ | B65D 41/04 |

* cited by examiner

KNIFE FOR CUTTING CAPSULES

This application is a § 371 National Stage Entry of International Patent Application No. PCT/IB2021/052304 filed Mar. 19, 2021 which claims priority of Patent Application No. IT 10 2020 000005920 filed Mar. 19, 2020. The entire content of these applications is incorporated herein by reference.

BACKGROUND OF THE INVENTION

The invention relates to a knife for cutting capsules or closures or caps made of plastic of the type used for closing containers, such as for example bottles. In particular the invention relates to a knife arranged for cutting the side wall of a capsule, so as to obtain—on such side wall—an tamper strip or ring and one or more connecting portions, also known as braces or hinges, which connect the tamper strip or ring to a different portion of the capsule, for example to the skirt, i.e. a portion of the side wall having a closed end of the capsule.

BRIEF DESCRIPTION OF THE PRIOR ART

Designing objects made of plastics is increasingly oriented toward the choice of recyclable materials and toward recovery of the objects after use thereof. Thus, closures provided with braces, which allow to hold the closure on the tamper ring thereof even after the container has been opened, are increasingly on high demand even in the container closures industry.

In use, when a cap provided with an tamper strip and with braces is applied to a mouth of a container, such as for example a bottle, to close the container, the tamper strip is positioned in a seat generally defined between two annular protrusions, with which the body of the container is provided, which limit the axial movements of the tamper ring. Upon unscrewing the closure, the container is opened, the tamper strip is held in the seat thereof and the braces hold the capsule joined to the tamper ring, and thus to the bottle, even after the closed end portion of the closure has been moved away from the mouth of the container.

This allows an effective recycling of plastics, given that the tamper ring can be separated from the bottle together with the closure at the same time, i.e. when one wants to recover the plastic material of the closure. Furthermore, keeping the closure connected to the tamper ring—even after opening the container—contributes toward preventing the dispersion of the capsule into the environment.

The braces on the side wall of a capsule are mainly obtained according to two types of processing operations: by forming, i.e. providing moulds suitably shaped to form the braces; or by cutting, i.e. by providing an arrangement of cuts and incisions on the side wall of the previously formed capsule. The cuts and incisions determine parts of the side wall that are partially detachable from the remainder of the side wall of the capsule, such parts of the side wall defining the connecting portions or braces besides the tamper ring. Techniques for producing braces which combine particular shapes of the mould for forming the capsule and given shapes of cuts obtained on the capsule after forming are also known.

Cutting devices including knives suitable to cut or incise a capsule in the side wall thereof so as to determine a circumferential line for weakening and preferential separation between the tamper strip and a remainder of the side wall of the capsule, i.e. of the skirt, are known. Such type of cut is also known under the name horizontal cut.

Cutting devices suitable to cut and incise—in one or more points or areas—a side wall of the capsule according to a direction substantially parallel to the axis of the capsule, for example so as to obtain weakening areas in the tamper strip or access points for a washing element to eliminate residues from the capsule are also known. Such type of cut is also known under the name vertical cut.

Cutting devices suitable to incise the side wall both with a horizontal cut and with a vertical cut in a radial position of the capsule, are also known. The latter cutting devices generally include a knife for the horizontal cut, positioned downstream of which is an insert provided with a vertical blade for incising the capsule by means of a vertical cut.

Cutting devices having knives including a variety of blades to obtain the connecting portions or braces, are also known.

The various cutting devices described above are provided with knives manufactured for specific cutting geometries and for specific dimensions of the capsule. This entails that the producer of capsules must procure and store in the warehouse thereof numerous knives with which to equip the cutting device whenever there arises the need to change the capsule production batch. Furthermore, having to equip the cutting device with a new knife requires considerable machine downtime and this entails high production costs. Furthermore, the knives used to obtain the braces are structurally complex, requiring a high number of parts which w ill then have to be replaced once worn, hence manufacturing caps with such complex structures increases the production costs.

SUMMARY OF THE INVENTION

An object of the invention is to improve the knives of the known type for capsule cutting apparatus.

Another object of the invention is to provide a knife for a capsule cutting apparatus for performing the incision on the braces or other elements on side walls of plastic capsules and having a relatively simple structure.

A further object of the invention is to provide a knife that is more versatile than the known knives that can be used, with slight variations, for incising various cutting geometries.

According to the invention a knife as defined by the attached claims is provided.

Owing to the invention it is possible to provide a knife with a layered structure that performs incisions—having a more or less complex geometry—by superimposing cutting tools whose cutting profiles are arranged according to different tilts.

Owing to the invention it is possible to provide one or more assembly configurations which allow to vary the cutting geometry to be applied to the capsules by adding and/or replacing cutting tools in the layered structure.

This allows to vary the geometry of the cut using the same knife or replacing a limited number of components therein.

BRIEF DESCRIPTION OF THE DRAWINGS

The invention can be better understood and carried into effect with reference to the attached drawings, in which some embodiments of the invention are shown by way of non-limiting examples, wherein.

DETAILED DESCRIPTION

Figures 1, 1A:
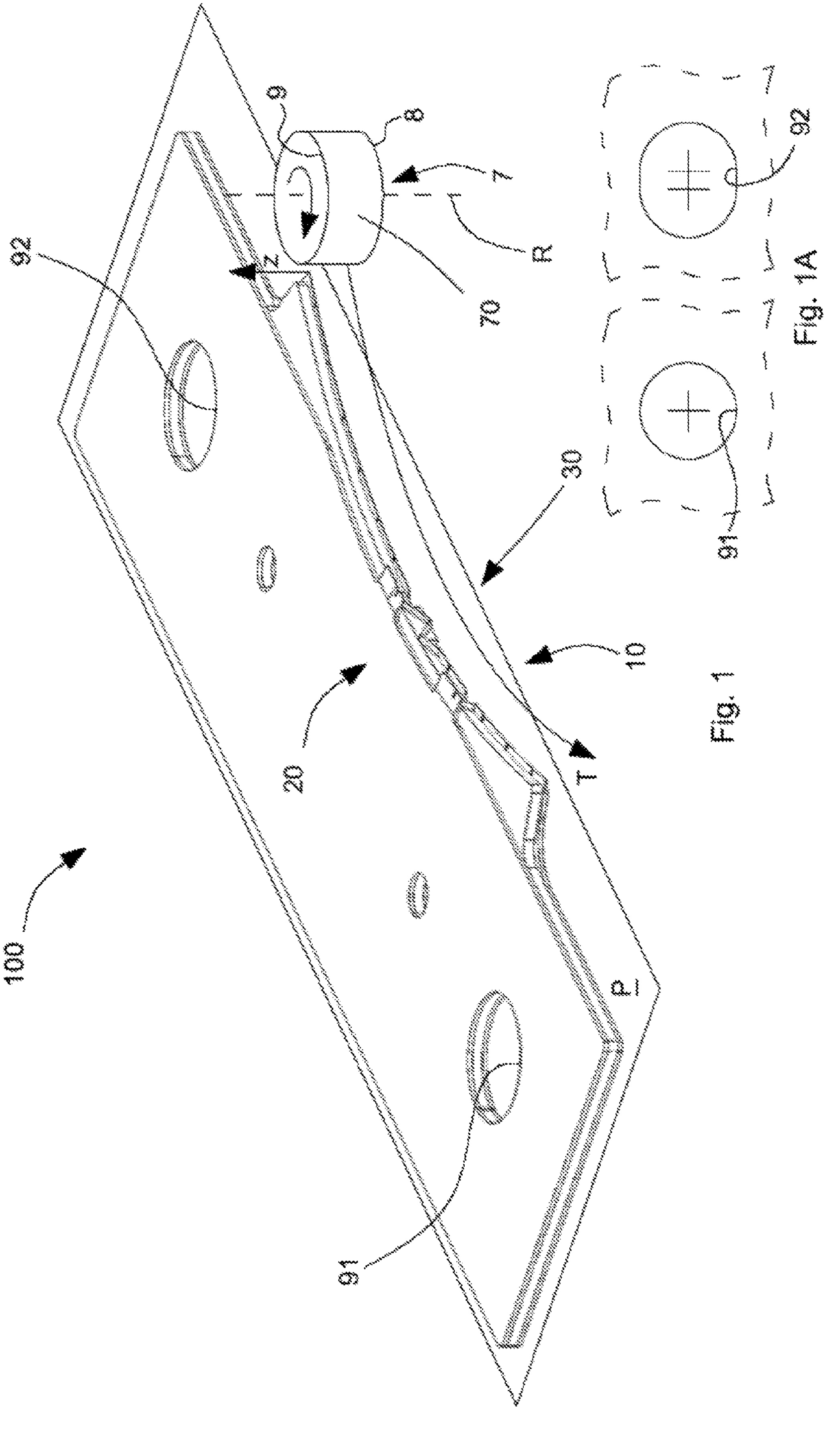
FIG. 1 is a perspective view of a first embodiment of a knife for cutting capsules.
FIG. 1A is a plan partial view of the knife of FIG. 1, illustrating two through holes.

With reference to FIGS. 1-6, 7A, 7B, a first embodiment of a knife for incising capsules or caps or closures, i.e. a knife 100 arranged for cutting or incising a side wall 70 of a capsule 7, is described. The capsule 7 is made of plastics and it is designed to close a container, such as for example a bottle. The capsule 7 has a cup-shaped main body and it is provided with a closed end 8 and with an open end 9.

The knife 100 is arranged for being fitted to a cutting apparatus to obtain incision lines and cuts on the capsule 7.

The word “cut” or “groove” is used to indicate an area of the capsule 7 provided with a perforating cut, i.e. a through slit where the material continuity was interrupted by the action of the knife. The word “incision” is used to indicate an area of the capsule 7 in which the side wall 70 has a low thickness caused by a penetration of the knife into the material up to a given depth without interrupting the material continuity.

The knife 100 includes a first cutting tool 10, a second cutting tool 20 and a third cutting tool 30. The knife 100 has a layered structure in which the third cutting tool 30 is arranged between the first cutting tool 10 and the second cutting tool 20. The first cutting tool 10, the third cutting tool 30 and the second cutting tool 20 are stacked on each other, in a removable assembly, as will be described hereinafter. The knife 100 is removably fixed to the frame of the cutting apparatus by a fastening arrangement, not shown, such as for example screw arrangement or bolt arrangement, which furthermore allows the cutting tools 10, 20, 30 to be clamped and removably fixed to each other. With reference to FIG. 1, each of the cutting tools 10, 20, 30 includes, in particular, at least one hole 91, 92 of the through type, arranged to receive the fastening arrangement, so that said cutting tools 10, 20, 30 can be removed or inserted from into the layered structure, based on the stacking order from top to bottom tool. With reference to FIG. 1A, the at least one hole 91, 92 can include, in particular, at least one eccentric hole, or slot 92, arranged for allowing a position adjustment of the cutting tools 10, 20, 30 independently from each other, in particular on a plane parallel to the plane P. The at least one hole 91, 92 enables, in particular, the selective removal of each cutting tool 10, 20, 30 to allow the removal and/or insertion of additional cutting tools, for example, to replace a tool with worn cutting edges or to change the arrangement of the cutting edges. For example, it is possible to replace only the third cutting tool 30, restoring the layered structure without replacing the first cutting tool or the second cutting tool.

The layered structure of the knife 100 defines a cutting portion of the knife 100, hereinafter indicated as arrangement of cutting edges 60. In the present description, the expression arrangement of cutting edges is used to indicate an arrangement or group of cutting edges of various shapes and sizes with which the knife is provided which allow the knife to perform cuts and/or incisions on the capsule 7 when the knife 100 is fitted to a cutting apparatus for incising and cutting capsules.

With reference to FIGS. 8-13, a second embodiment of knife, i.e. a knife 100', is illustrated. The difference between the knife 100' and the knife 100 lies in the addition of two cutting tools, i.e. a fourth cutting tool 40 and a fifth cutting tool 50, and in the replacement of the cutting tool 30 with a further cutting tool 30'. Such layered structure defines a cutting portion of the knife 100', i.e. an arrangement of cutting edges 60'.

Figure 7A:
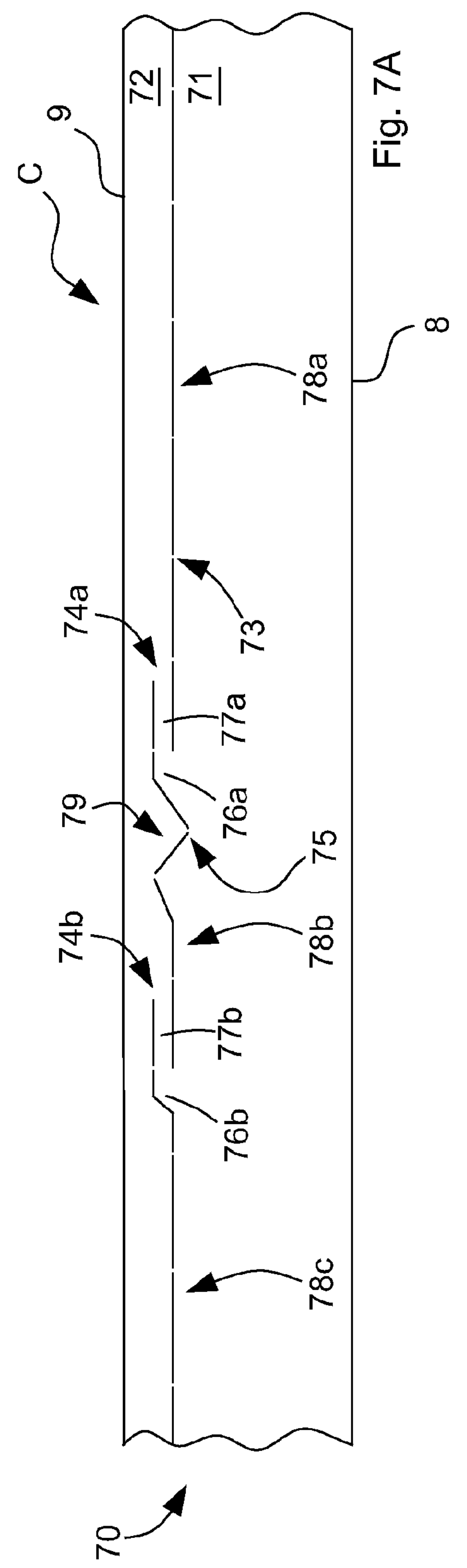
FIG. 7A is a cylindrical projection view of a side wall of a capsule incised by the knife of FIG. 1, in a closing configuration of the capsule.
Figure 7B:
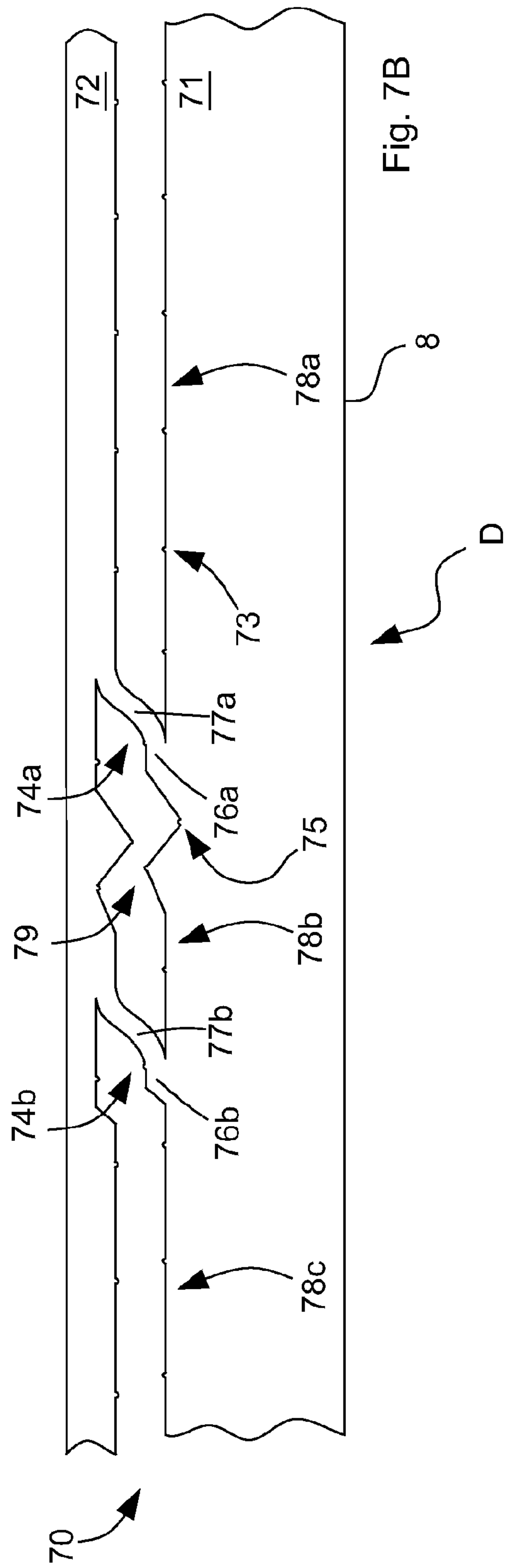
FIG. 7B is a cylindrical projection view of a side wall of a capsule incised by the knife of FIG. 1, in an opening configuration of the capsule.
Figure 9A:
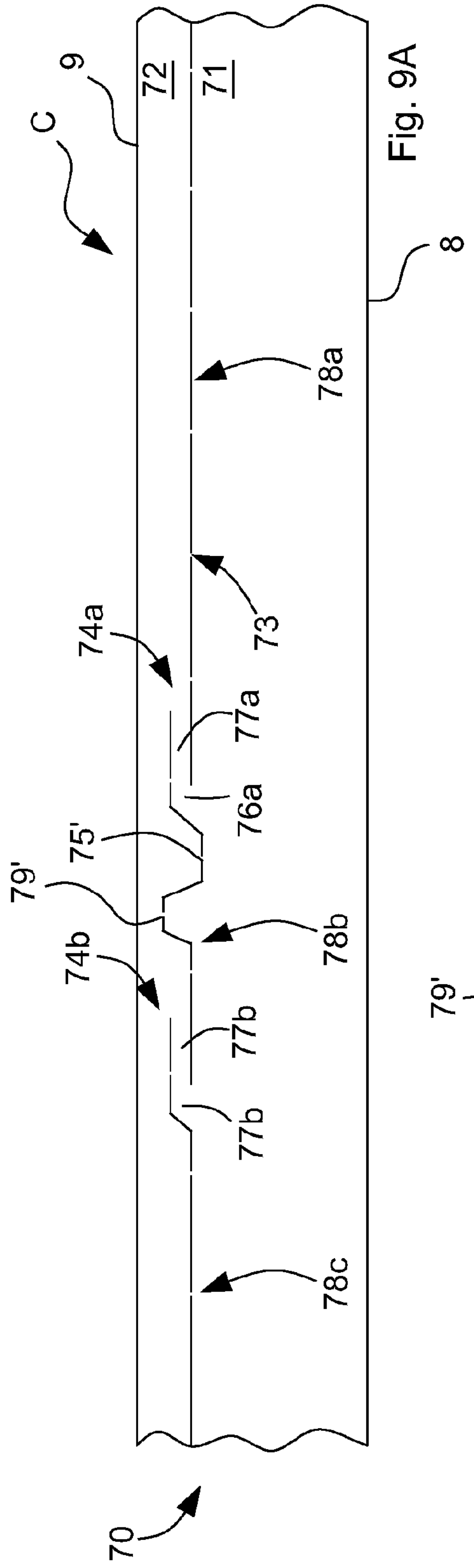
FIG. 9A is cylindrical projection view of a side wall of a capsule incised by the knife having the arrangement of blades of FIG. 8, in a closing position of the capsule.
Figure 9B:
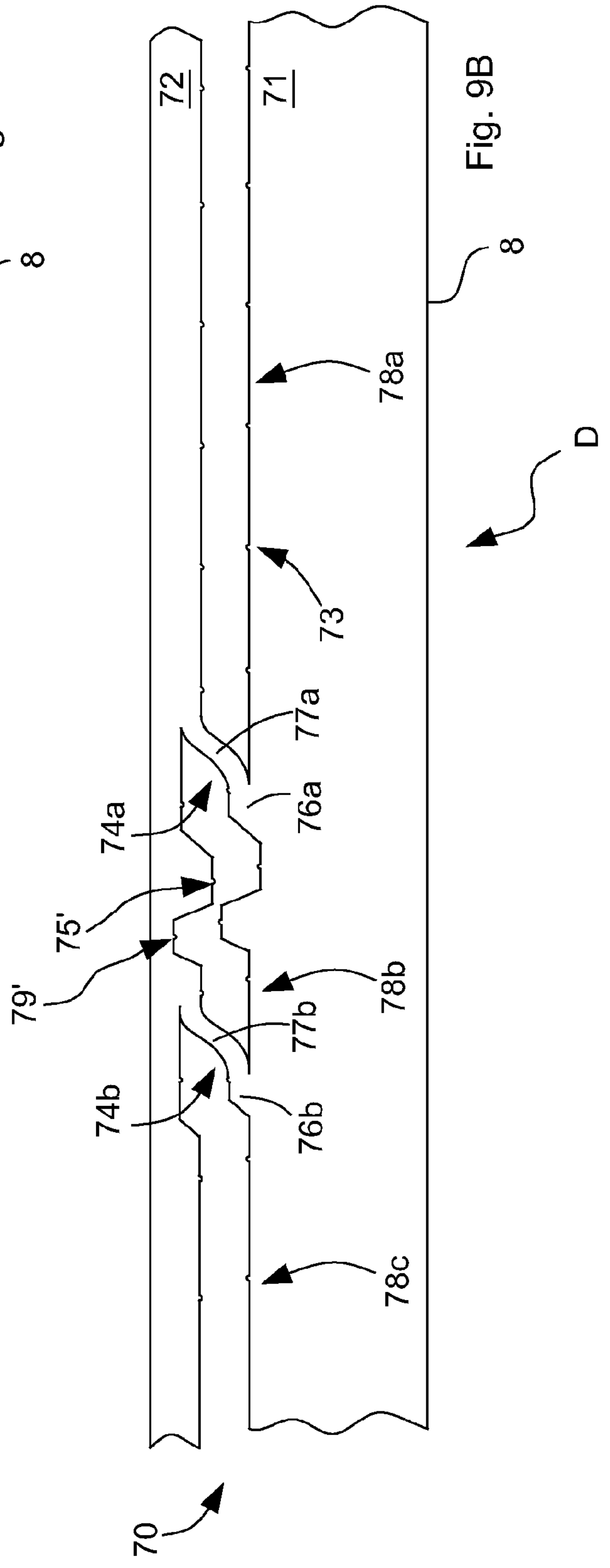
FIG. 9B is a cylindrical projection view of a side wall of a capsule incised by the knife having the arrangement of blades of FIG. 8, in an opening position of the capsule.

The knife 100, 100' is suitable to form a tamper strip or ring 72 in the capsule 7 (FIGS. 7A, 7B, 9A, 9B). The knife 100, 100' is suitable to form connecting portions **74*a*, 74*b* between the tamper ring 72 and the side wall 70. The main body of the capsule 7 remains connected to the tamper ring 72 by means of the connecting portions 74*a*, 74*b* even when the capsule 7** is removed from a mouth of the container on which it had been applied to open the container and access the content, i.e. when the capsule is in an opening configuration D (FIGS. 7B, 9B).

The knife 100, 100' inside the cutting apparatus cooperates with a rotary spindle (not shown) which grips the capsule 7, by rotating the capsule around a rotation axis R parallel to or coincident with, an axis of the capsule 7. The rotary spindle brings the side wall 70 of the capsule 7 into contact with a cutting portion of the knife 100, 100', moving the capsule 7 along a substantially circumference arc-like path in an advancement direction T and rotating the capsule 7 on the rotation axis R, by rolling the capsule against the cutting portion of the knife 100, 100'. As known, possible slipping of the capsule with respect to the spindle or to the cutting portion are undesired.

Depending on the arrangement of cutting edges 60, 60' of the cutting portion of the knife 100, 100', there is a corresponding incision on the side wall 70 of the capsule 7. In other words, such arrangement of cutting edges 60, 60' is shown in a negative fashion on the side wall 70 of a capsule 7.

Figures 10, 10A:
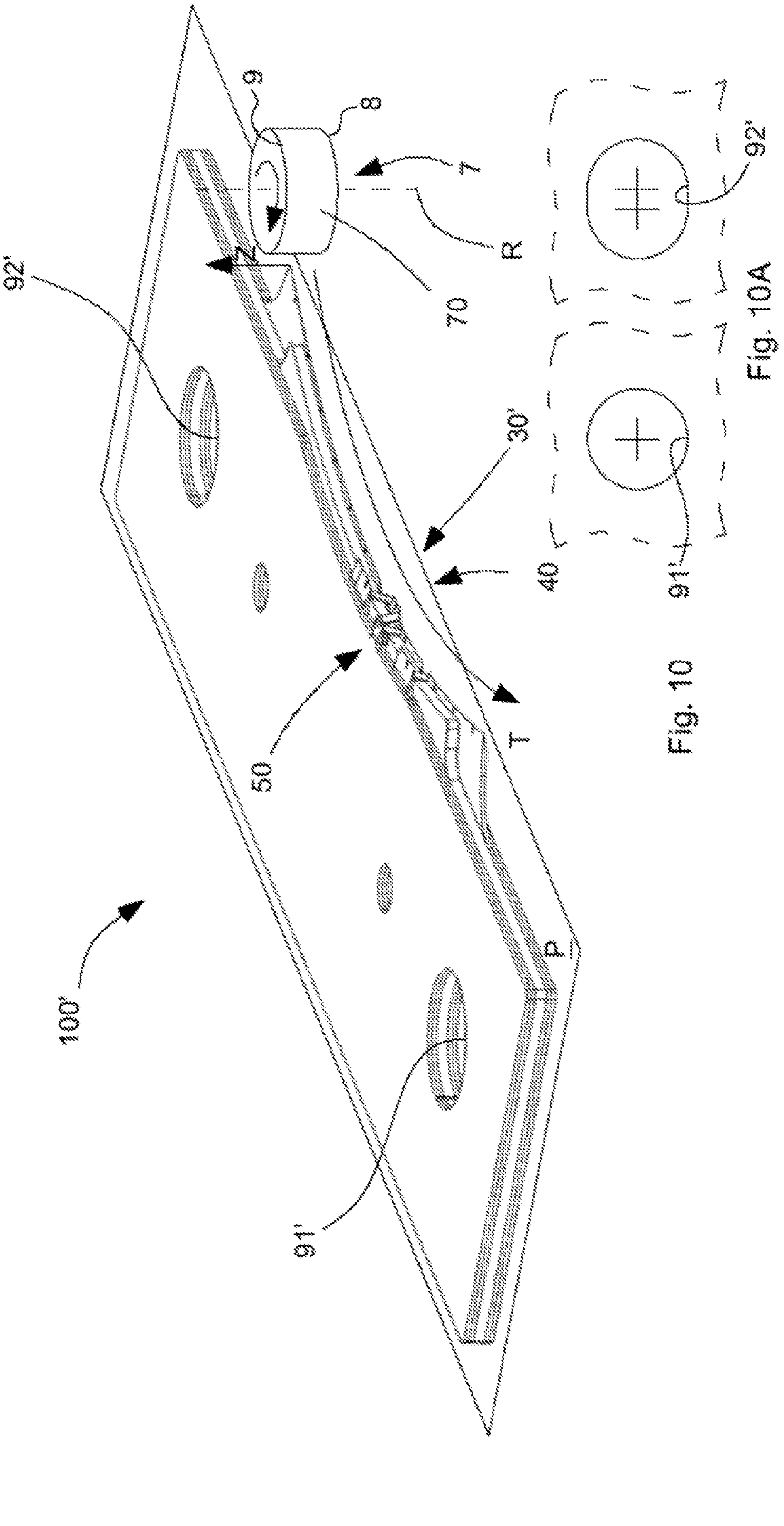
FIG. 10 is a perspective view of the second embodiment of the knife for cutting capsules having the arrangement of blades of FIG. 8.
FIG. 10A is a plan partial view of the knife of FIG. 10, illustrating two through holes.

With reference to FIGS. 1 and 10, it should be noted that the advancement direction T and the direction of rotation R of the capsule 7 are only indicative and the effect of the knife 100, 100' on the capsule 7 is equal to the one that can be obtained with an advancement direction T and direction of rotation R of the capsule both reversed.

With reference to FIGS. 6, 8, 7B, 9B the arrangement of cutting edges 60, 60' defines in the side wall 70 after the cutting and incision action—the skirt 71 and the tamper strip or ring 72. In the description below the term "skirt" is associated with the side wall portion 70 having the closed end 8, while the expression "tamper strip" or "tamper ring" is associated with the side wall portion 70 having the open end 9, substantially annular-shaped.

The skirt 71 and the tamper strip 72 are connected to each other by a plurality of connecting portions or braces 74*a*, 74*b* and by a plurality of bridges 73, i.e. elements made of plastic material intended to be broken by the user at the first opening of the container on which the capsule 7 is applied to prove the tampering with the closure of the container.

With reference particularly to FIGS. 7A and 9A, the capsule 7, whose side wall 70 is shown unrolled on a representation plane, appears on a closing configuration C wherein the bridges 73, are whole and contribute together to the braces 74*a*, 74*b* to join the tamper strip 72 to the skirt 71. The closing configuration C is taken by the capsule prior to being applied to a container or after its application and before the container is opened for the first time and capsule is actuated.

With reference particularly to FIGS. 7B and 9B, the capsule 7, whose side wall 70 is shown unrolled on a representation plane, appears on an opening configuration D wherein the bridges 73 are broken, the skirt 71 is spaced from the tamper strip 72 and the tamper strip 72 is connected to the skirt 71 solely by the braces 74*a*, 74*b*. The opening configuration D is taken by the capsule applied to a container and after the first opening of the container from which the capsule is moved away.

Once again with reference to FIGS. 1-3 and particularly to FIG. 3, the first cutting tool 10 has a plate-like structure, i.e. it mainly extends along two main dimensions with respect to a third transversal dimension, and in particular a rectangular base. The first cutting tool 10 has two flat faces, substantially parallel to each other and with the first plane P: the first lower face 14 and the first upper face 15.

The first cutting tool 10, in a first peripheral region 17, includes a plurality of first blades 11, for example first blades 11*a*, 11*b*, 11*c*, and a plurality of first recesses 16*a*, 16*b*. The plurality of first blades 11*a*, 11*b*, 11*c* of the first cutting tool 10 and the first recesses 16 are arranged alternatingly along the first peripheral region 17 of the cutting tool 10, defining an indented or serrated profile obtained projecting the first cutting tool 10 on the plane P. The first blades 11*a*, 11*b*, 11*c* may include one or more first cavities 13 arranged to form the bridges 73. Furthermore, the first blades 11*a*, 11*b*, 11*c* are provided on the free end thereof with first cutting edges 12*a*, 12*b*, 12*c*.

The first cutting edges 12*a*, 12*b*, 12*c* lie on the same first plane parallel to the plane P, thus the cutting tool 10 is a horizontal cutting tool. With respect to the plane P, on a vertical axis Z, orthogonal to the plane P, the first plane is at a given height. Joining the plurality of the first cutting edges 12*a*, 12*b*, 12*c* allows to obtain a first substantially circumference arc-shaped curved line whose centre is located outside the knife 100, 100' on an axis substantially orthogonal to the plane P. The first cutting tool 10 is arranged to contribute to the formation of braces 74*a*, 74*b* on the side wall 70, together with the second cutting tool 20 and with the third cutting tool 30, and it performs the incisions and cuts that separate the skirt 71 form the tamper strip 72. The first cavities 13 are spaced apart and suitably dimensioned so as not to interrupt the continuity of the material, for example so as not to alter locally or to incise but not perforating the side wall 70 of the capsule, so as to allow to form the bridges 73.

Figure 2:
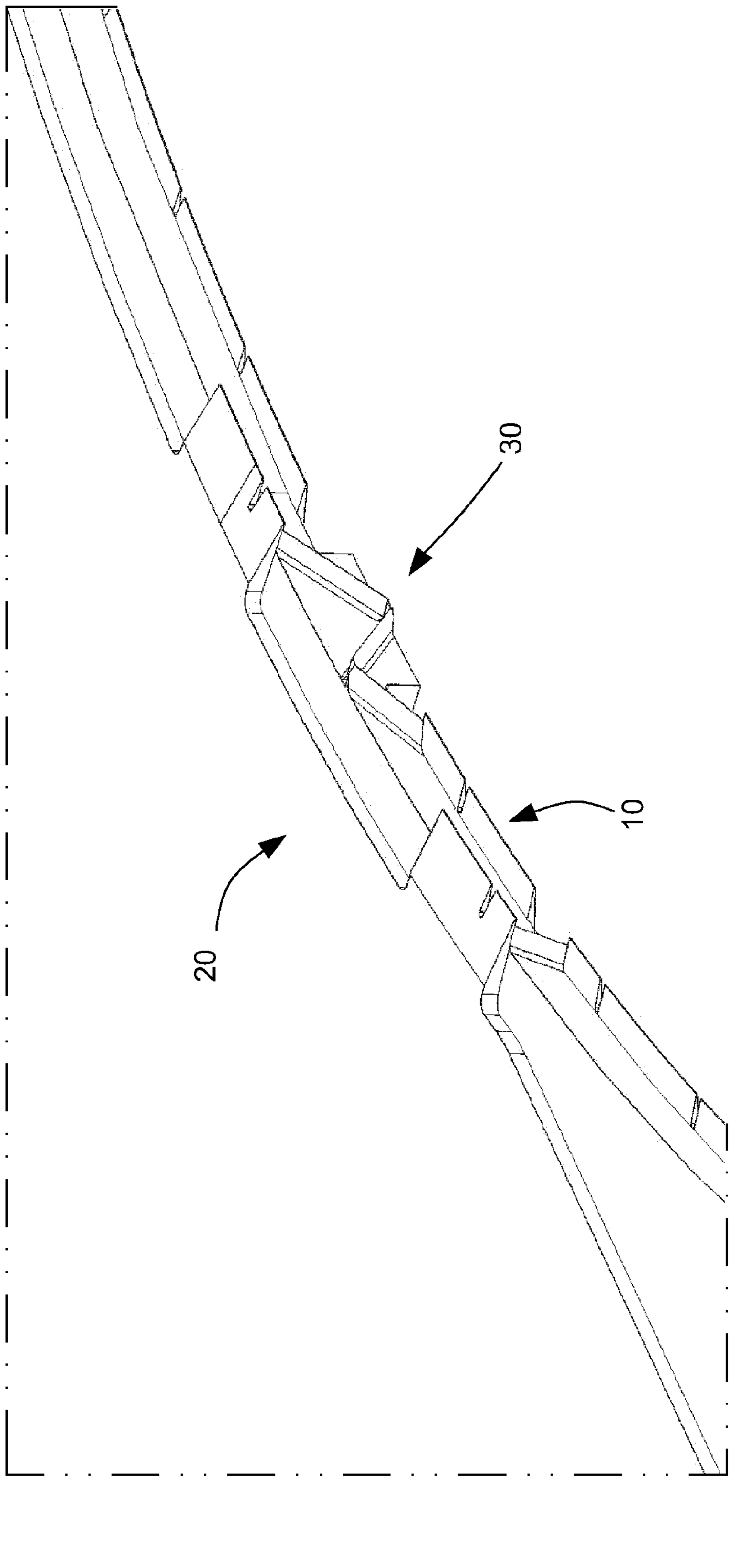
FIG. 2 is a detail of FIG. 1, illustrating a first cutting tool, a second cutting tool and a third cutting tool.
Figure 3:
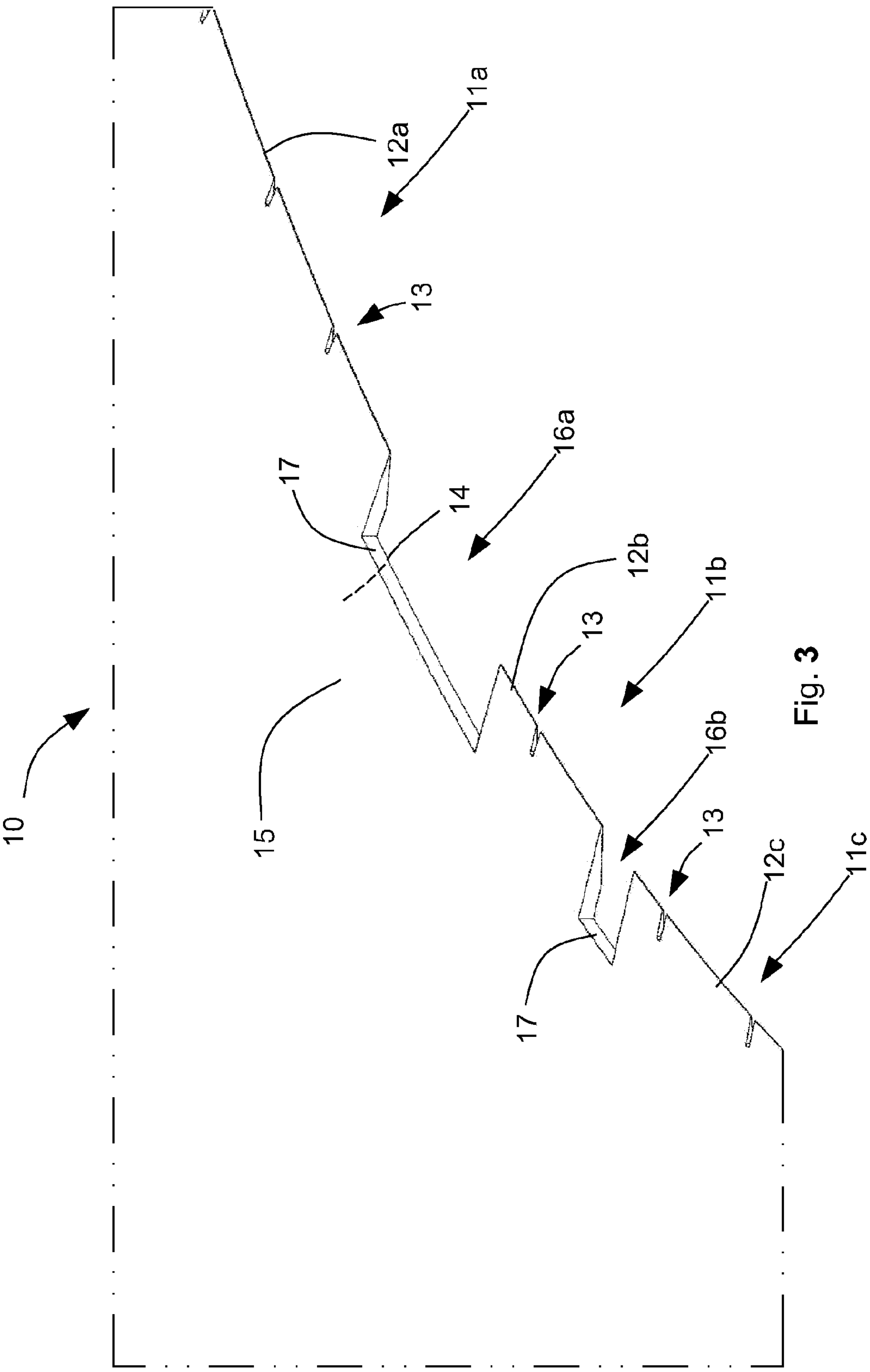
FIG. 3 is a detail of FIG. 1, showing the first cutting tool.
Figure 4:
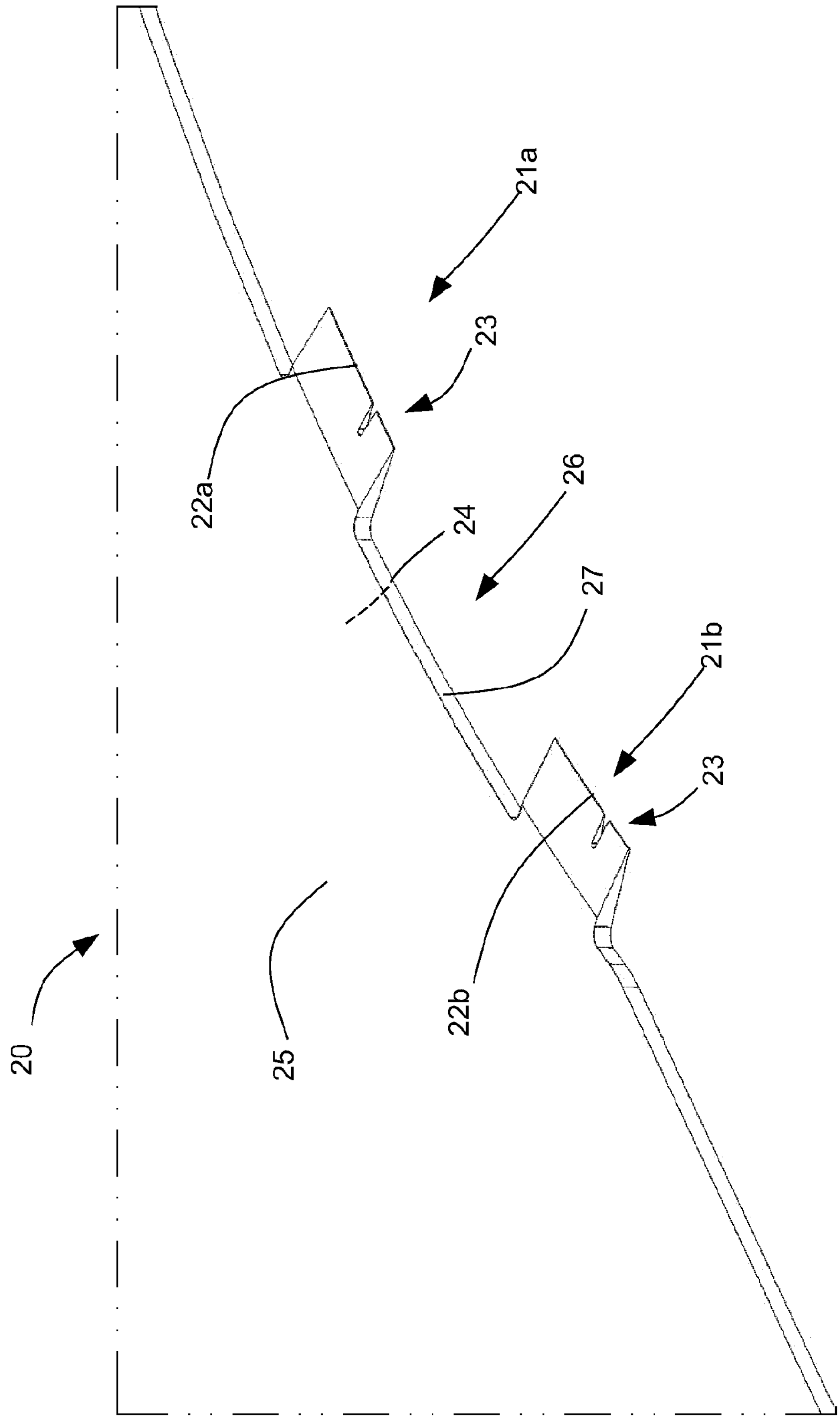
FIG. 4 is a detail of FIG. 1, showing the second cutting tool.

With reference to FIGS. 1, 2 and 4, the second cutting tool 20 has a plate-like structure, which extends parallel to the plane P, and in particular a rectangular base. The second cutting tool 20 has two flat faces, substantially parallel to each other and to the plane P, i.e. the second lower face 24 and the second upper face 25.

The second cutting tool 20, in a second peripheral region 27, includes a plurality of second blades 21, including for example second blades 21*a*, 21*b* and a plurality of second recesses 26. The second blades 21*a*, 21*b* and the second recess 26 are arranged alternatingly along the second peripheral region 27 of the cutting tool 20, defining an indented profile in an orthogonal projection on the plane P. The second blades 21*a*, 21*b* may include one or more second cavities 23 arranged in defined positions in the second blades 21*a*, 21*b*. The second blades 21*a*, 21*b* are provided—on the free end thereof—with second cutting edges 22*a*, 22*b*.

The second cutting edges 22*a*, 22*b*, lie on the same first plane parallel to the plane P, thus the cutting tool 20 is a horizontal cutting tool. Joining the plurality of the second cutting edges 22*a*, 22*b* allows to obtain a second substantially circumference arc-shaped curved line, whose centre is located outside the knife 100 on a second axis substantially orthogonal to the plane P. The second curve defined by the plurality of second cutting edges 22*a*, 22*b* lies on a second plane parallel to the plane P at a second height different from the first height on the vertical axis Z. The second cutting tool 20 is arranged to contribute to the formation of braces 74*a*, 74*b* on the side wall 70 of the capsule, together with the first cutting tool 10 and the third cutting tool 30. The second cavities 23 are spaced apart and suitably dimensioned so as not to interrupt the continuity of the material, for example so as not to locally alter or to incise but not perforating the side wall 70 of the capsule, so as to allow to form the bridges 73.

Figure 5:
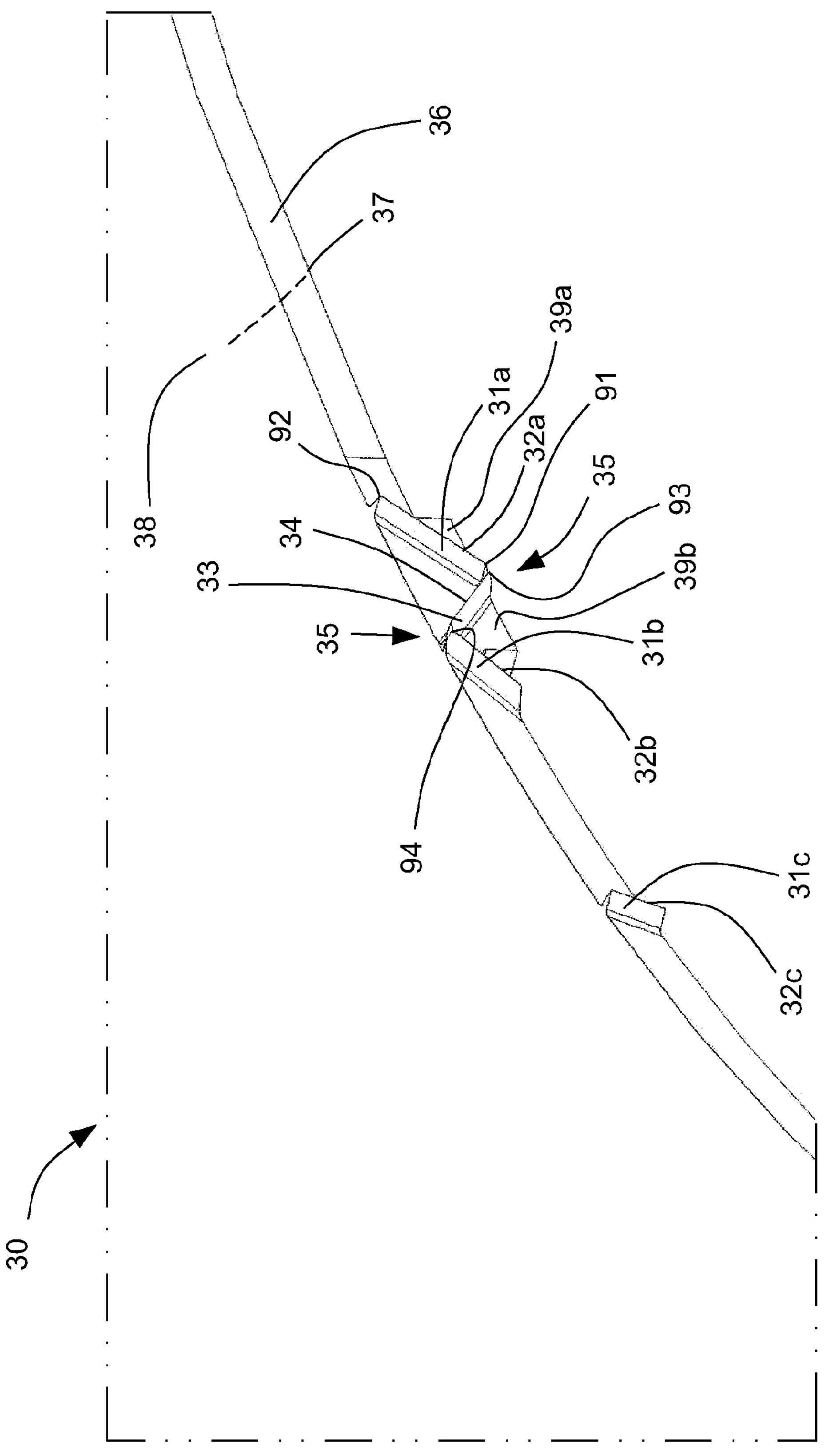
FIG. 5 is a detail of FIG. 1, showing the third cutting tool.

With reference to FIGS. 1, 2 and 5, the third cutting tool 30 has a plate-like structure, parallel to the plane P, and in particular a rectangular base. The third cutting tool 30 has two flat faces, substantially parallel to each other, i.e. the third lower face 37 and the third upper face 38.

The third cutting tool 30 is arranged to perform oblique cuts on the side wall 70. In a peripheral region 36 thereof, the third cutting tool 30 includes one or more third tilted blades 31*a*, 31*b*, 31*c*, 33 provided with respective tilted cutting edges 32*a*, 32*b*, 32*c*, 34. At least two tilted cutting edges 32*a*, 34 have a different tilt from each other, with reference to a reference plane passing through the vertical axis Z and tangent to the advancement direction T.

In particular, the tilted cutting edge 32*a* has a negative tilt and the tilted cutting edge 34 has a positive tilt. The negative tilt corresponds to a cutting edge having an upper end thereof receded with respect to a lower end thereof along said advancement direction T and, vice versa, said positive tilt corresponds to a cutting edge having an upper end thereof which is advanced with respect to a lower end thereof along said advancement direction T. As a matter of fact, the tilted cutting edge 32*a* includes an tipper end 92 thereof and a lower end 91 thereof and—considering the advancement direction T—the upper end 92 is receded with respect to the lower end 91, thus the tilted cutting edge 32*a* with negative tilt. Similarly—the tilted cutting edge 34 includes an upper end 94 thereof and a lower end 93 thereof and—considering the advancement direction T—the upper end 94 is more advanced with respect to the lower end 93, thus the tilted cutting edge 34 has a positive tilt.

Besides the at least two tilted cutting edges with different mutual tilt 32*a*, 34, the third cutting tool 30 includes further third blades with negative tilt 31*b*, 31*c*, provided on the respective free end of tilted cutting edges with negative tilt and it may include one or more third vertical blades (not shown) with respective vertical cutting edges.

Thus, with respect to the cartesian plane formed by the vertical axis Z orthogonal to the plane P and by an axis oriented substantially as the advancement direction T, starting from any point of the advancement direction T, the tilted cutting edges of the third tilted blades may be oriented on the peripheral region 36 in the following alternative fashions:

- with a negative tilt, such as for example the third blades with negative tilt 31*a*, 31*b*, 31*c;*
- with a positive tilt, such as for example the third blade with positive tilt 33;
- vertically (not shown), i.e. parallel to the axis Z.

The peripheral region 36 of the third cutting tool 30 defines a third substantially circumference arc-shaped curve lying in a third plane, the centre of the circumference is located outside the knife 100 on a third axis substantially orthogonal to the plane P. The peripheral region 36 further defines the surface of the third cutting tool 30 against which the side wall 70 of the capsule 7 can be rotated on the rotation axis R thereof while the knife 100 performs incisions and cuts on the side wall 70. In other words, the third curvature defined by the peripheral region 36 contributes to guide the capsule 7 along the path thereof for interaction with the knife 100 in the advancement direction T.

The third blades with negative tilt 31*a*, 31*b*, 31*c* and the third blades with positive tilt 33 may include cavities (not shown) spaced apart and suitably dimensioned so as not to interrupt the continuity of the material, for example so as not to alter locally or for incising but not perforating the side wall 70 of the capsule, so as to allow to form the bridges 73.

With reference to FIG. 5, bridges made of plastic material may be formed on the capsule 7 at the cavities 35 defined by respective lower ends and/or respective upper ends of the tilted cutting edges, such ends being arranged at a predefined distance, in particular considerably small. For example, considering, the pair of tilted cutting edges 32*a*, 34 the respective lower ends 91 and 93 are at a limited distance and form a cavity 35 which forms—on the capsule 7—with the action of the knife 100 a corresponding bridge 75 (FIGS. 7A, 7B), which will be broken similarly to the bridges 73 when passing from the closing configuration C to the opening configuration D of the capsule 7. A similar bridge is formed during the cut between the upper end 94 of the cutting edge with positive tilt 34 and the respective upper end of the cutting edge with negative tilt 32*b*.

The third tilted blade 31*a* extends below the third lower face 37 of the third cutting tool 30 and it is supported by a support protrusion 39*a*, which projects from the third lower face 37 below it. In a version not shown, the third tilted blade 31*a* may be laterally contained in the thickness of the third cutting tool 30, i.e. the lower end thereof does not protrude from the third lower face 37. In this version, the support protrusion 39*a* may not be present.

The third tilted blade 31*b* extends below the third lower face 37 of the third cutting tool 30 and it is also supported by a further support protrusion 39*b* which projects from the third lower face 37 below it. The further support protrusion 39*b* may be obtained in the support protrusion 39*a*. In a version, not shown, the third tilted blade 31*b* may be entirely contained in the thickness of the third cutting tool 30, i.e. the lower end thereof does not protrude from the third lower face 37. In this version, the support protrusion 39*b* may not be present.

Each support protrusion 39*a*, 39*b* is shaped so as to be received n a recess present on the first cutting tool 10. In particular, the support protrusions 39*a*, 39*b* are both received in the recess 16*a* of the first cutting tool 10.

The third cutting tool 30 is arranged to form oblique cuts 79 on the side wall 70 of the capsule 7, where oblique cuts also include vertical cuts.

Still with reference to FIGS. 1-5, an assembly configuration of the knife 100 provides for the interposition of the third cutting tool 30 between the first cutting tool 10 and the second cutting tool 20, as described hereinafter.

In such assembly configuration of the knife 100:

- the second lower face 24 is at contact with the third upper face 38;
- the third lower face 37 is at contact with the first upper face 15.

Furthermore, in such assembly configuration of the knife 100:

- the first axis of the first curvature defined by the first cutting edges 12*a*, 12*b*, 12*c* of the first cutting tool 10;
- the second axis of the second curvature defined by the second cutting edges 21*a*, 21*b* of the second cutting tool 20; and
- the third axis of the third curvature defined by the peripheral region 36 of the third cutting tool 30 are substantially coincident with each other.

Furthermore, in such assembly configuration of the knife 100, the relative position between:

- the first blades 11*a*, 11*b*, 11*c;*
- the second blades 21*a*, 21*b;*
- the third blades with negative tilt 31*a*, 31*b*, 31*c;*
- the third blades with positive tilt 33; and
- possible third vertical blades;

defines an arrangement of cutting edges 60 of the knife 100.

Figure 6:
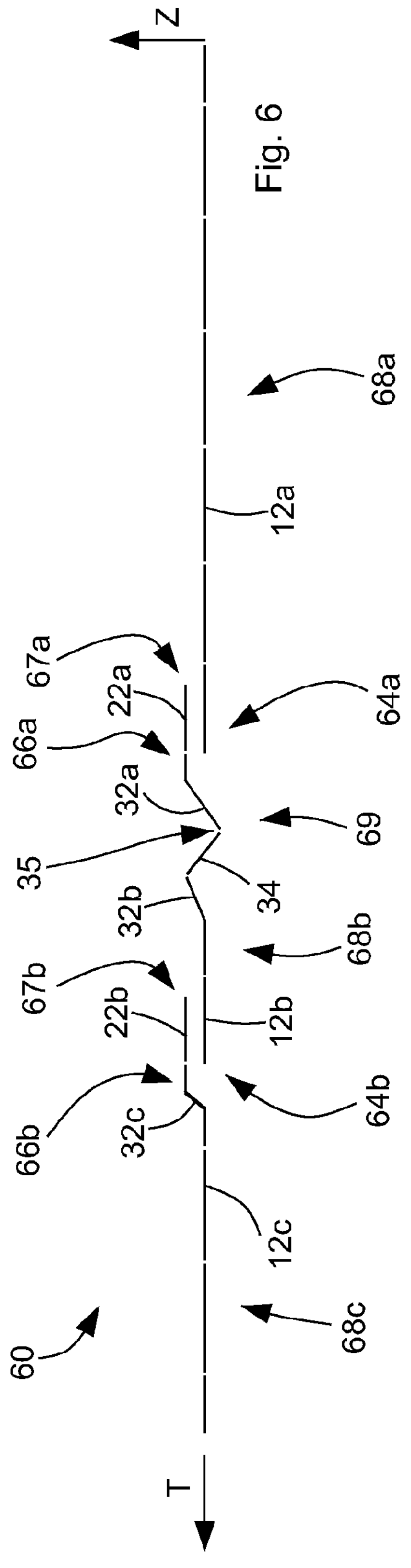
FIG. 6 is a schematic view of the arrangement of blades of the knife of FIG. 1.

Now, with reference to FIG. 6, the arrangement of cutting edges 60 of the knife 100 is defined by:

- the first cutting edges 12*a*, 12*b*, 12*c* lying on a first plane parallel to the plane P;
- the second cutting edges 22*a*, 22*b* ling on the second plane parallel to the plane P;
- the third cutting edges with negative tilt 32*a*, 32*b*, 32*c* and the third cutting edges with positive tilt 34 arranged in an oblique fashion with respect to the plane P.

The arrangement of cutting edges 60 may include possible third vertical cutting edges orthogonal to the plane P.

As already mentioned above, the first cutting edges 12*a*, 12*b*, 12*c* and the second cutting edges 22*a*, 22*b* are arranged with respect to each other at different heights along the vertical axis Z, i.e. at different distances from the plane P.

With reference to FIGS. 7A and 78, depending on the relative position between the cutting edges of the cutting tools, the knife 100 forms—on the side wall 70 of the capsule 7—different components:

- one or more intended detachment lines 78*a*, 78*b*, 78*c* arranged on the same plane and obtained by a penetration of the first cutting edges 12*a*, 12*b*, 12*c* passing through the thickness of the side wall 70;
- one or more connecting portions, or braces 74*a*, 74*b*, each in turn including:
  - a central portion 77*a*, 77*b*, obtained by the through penetration of the first cutting edges 12*a*. 12*b*. 12*c* and of the second cutting edges 22*a*, 22*b*; and
  - a joint portion 76*a*, 76*b*, obtained by the through penetration of the second cutting edges 22*a*, 22*b* and of the third cutting edges with negative tilt 32*a*, 32*b*, 32*c* and of the third cutting edges with positive tilt 34;

one or more oblique cuts 79, due to the penetration of the third blades with negative tilt 31*a*, 31*b*, 31*c* and of the third blades with positive tilt 34.

In detail, with reference to FIG. 6, following the advancement direction T, the knife 100 includes:

an opening forming part 68*a*, including the first cutting edge 12*a* which lies on the first plane parallel to the plane P. The opening forming part 68*a* extends for example for about 50% of the length of the knife 100. The relative intended detachment line 78*a* corresponds to the opening forming part 68*a* on the capsule 7 (FIGS. 7A, 7B);

a connection forming part 64*a*. The connection forming part 64*a* extends for example for about 10% of the length of the knife 100. The brace 74*a* corresponds to the connection forming part 64*a* on the capsule 7. The connection forming part 64*a* in turn includes:

a connection forming central part 67*a*, wherein the last portion of the first cutting edge 12*a* is superimposed along the vertical axis Z on an initial portion of the second cutting edge 22*a* lying on the second plane. i.e. at a higher height with respect to the first cutting edge 12*a*. The connection forming central part 67*a* extends for example for about ⅔ of the connection forming part 64*a*. A respective central part of the brace 77*a* corresponds to the connection forming central part 67*a;* a joint forming part 66*a*, downstream of the connection forming central part 67*a*, in which there is a brief section of the second cutting edge 22*a*, whose end of the final portion thereof is at the initial end of a third cutting edge with negative tilt 32*a*. In other words, the joint forming part 66*a* includes the final portion of the second cutting edge 22*a* and the third cutting edge with negative tilt 32*a*. The joint forming part 66*a* extends for example for about ⅓ of the connection forming area 64*a*. The respective joint portion 76*a* corresponds to the joint forming part 66*a* on the capsule 7;

a brace forming central part 69, wherein the final end of the third cutting edge with negative tilt 32*a* ends at a height that can be equal to or lower than that of the plane parallel to the first plane on which the first cutting edge 12*a* lies. The initial end of the third cutting edge with positive tilt 34 is located at the final end of the third cutting edge with negative tilt 32*a*. The third cutting edge with positive tilt 34 ends at a height that is equal, but it can be higher, to that of the second plane on which the second cutting edge 22*a* lies. The final upper end of the third cutting edge with positive tilt 34 is at the initial upper end of a third cutting edge with negative tilt 32*b* tilted. The brace forming central part 69 further includes the third cutting edge with positive tilt 34 and the third cutting edge with negative tilt 32*b* One or more oblique cuts 79 correspond to the brace forming central part 69 on the side wall 70. The brace forming central part 69 extends for example between 5% and 10% of the length of the knife 100;

a further opening forming part 68*b*, including a first cutting edge 12*b* lying on the first plane. The further opening forming part 68*b* extends for example between 5% and 10% of the length of the knife 100. The relative intended detachment line 78*b* corresponds to the further opening forming part 68*b;* a further connection forming part 64*b*. The further connection forming part 64*b* extends for example for about 10% of the length of the knife 100. The brace 74*b* corresponds to the further connection forming part 64*b*. The further connection forming part 64*b* in turn includes:

a further connection forming central part 67*b* wherein the last portion of the first cutting edge 12*b* is superimposed along the vertical axis Z on an initial portion of the second cutting edge 22*b* lying on the second plane. i.e. at a for example higher height with respect to the first cutting edge 12*a*. The further connection forming central part 67*b* extends for example for about ⅔ of the further connection forming part 64*b*. The respective brace central portion 77*b* corresponds to the further connection forming central part 67*b;* a further joint forming part 66*b*, downstream of the further connection forming central part 67*b*, in which there is a brief section of the second cutting edge 22*b*, whose end of the final portion thereof is at the initial end of a third cutting edge with negative tilt 32*c*. In other words, the further joint forming part 66*b* includes the final portion of the second cutting edge 22*b* and the third cutting edge with negative tilt 32*c*. The further joint forming part 66*b* extends for example for about ⅓ of the further connection forming part 64*b*. The respective joint portion 76*b* corresponds to the further joint forming pan 66*b* on the capsule 7:

a further opening forming part 68*c*, in which—at the final end of the third cutting edge with negative tilt 32*c*—there is located a first cutting edge 12*c* lying on the first plane which extends for example for about 20% of the length of the knife 100 along the advancement direction T. The respective intended detachment line 78*c* corresponds to a still further opening forming part 68*c*.

It should be observed that the arrangement of cutting edges 60, since it is suitable for cutting an object with substantially cylindrical symmetry, may have a different order of the parts of the arrangement of cutting edges 60 described above provided that succession is complied with; for example the opening forming parts 68*a* and 68*c* of the arrangement of cutting edges 60 may be incorporated in a single opening forming part arranged together as an initial or final part of the arrangement of cutting edges 60 along the advancement direction T.

In the context of the invention, the terms "initial/final", "starts/ends" and "start/end", "upstream/downstream" are used to indicate the order in which the projections of the ends of the cutting edges along the advancement direction T are found.

The layered structure of the knife and the relative assembly configuration allow to change the arrangement of cutting edges to be incised on the capsules by adding and/or replacing cutting tools in the assembly configuration. In particular, given that the horizontal cuts may be maintained for a given dimension of the capsule, the third cutting tool can be replaced to produce—on a capsule of the same dimension—a different shape of the braces, without having to replace the first cutting tool and the second cutting tool too. This is allowed by the fact that the shape of the braces is substantially determined by the cutting edges with different tilt that are provided for in the third cutting tool.

In the second illustrated embodiment, the knife 100', includes additional cutting tools arranged to incise the side surface 70 of the capsules 7, i.e. a fourth cutting tool 40 and a fifth cutting tool 50. In the embodiment of the knife 100' there are also present the first cutting tool 10 and the second cutting tool 20, while the cutting tool 30' has the same number of blades as the version according to FIGS. 1-6 with a different arrangement, as described hereinafter. The fourth cutting tool 40, the first cutting tool 10, the third cutting tool 30', the second cutting tool 20 and the fifth cutting tool 50 are stacked on each other, in a removable assembly. The knife 100' is removably fixed to the frame of the cutting apparatus by a fastening arrangement, not shown, such as for example screw arrangement or bolt arrangement, which furthermore allows the cutting tools 10, 20, 30', 40, 50 to be clamped and removably fixed to each other. With reference to FIG. 10, each of the cutting tools 10, 20, 30', 40, 50 includes, in particular, at least one hole 91, 92' of the through type, arranged to receive the fastening arrangement, so that said cutting tools 10, 20, 30', 40, 50 can be removed or inserted from/into the layered structure, according to the stacking order from top to bottom tool. With reference to FIG. 10A, the at least one hole 91', 92' can include, in particular, at least one eccentric hole, or slot 92', arranged for allowing a position adjustment of the cutting tools 10, 20, 30' independently from each other, in particular on a plane parallel to the plane P. The at least one hole 91', 92 enables, in particular, the selective removal of each cutting tool 10, 20, 30' to allow the removal and/or insertion of additional cutting tools, for example, to replace a tool with worn cutting edges or to change the arrangement of the cutting edges. For example, it is possible to replace only the third cutting tool 30', restoring the layered structure without replacing the other cutting tools.

Figure 12:
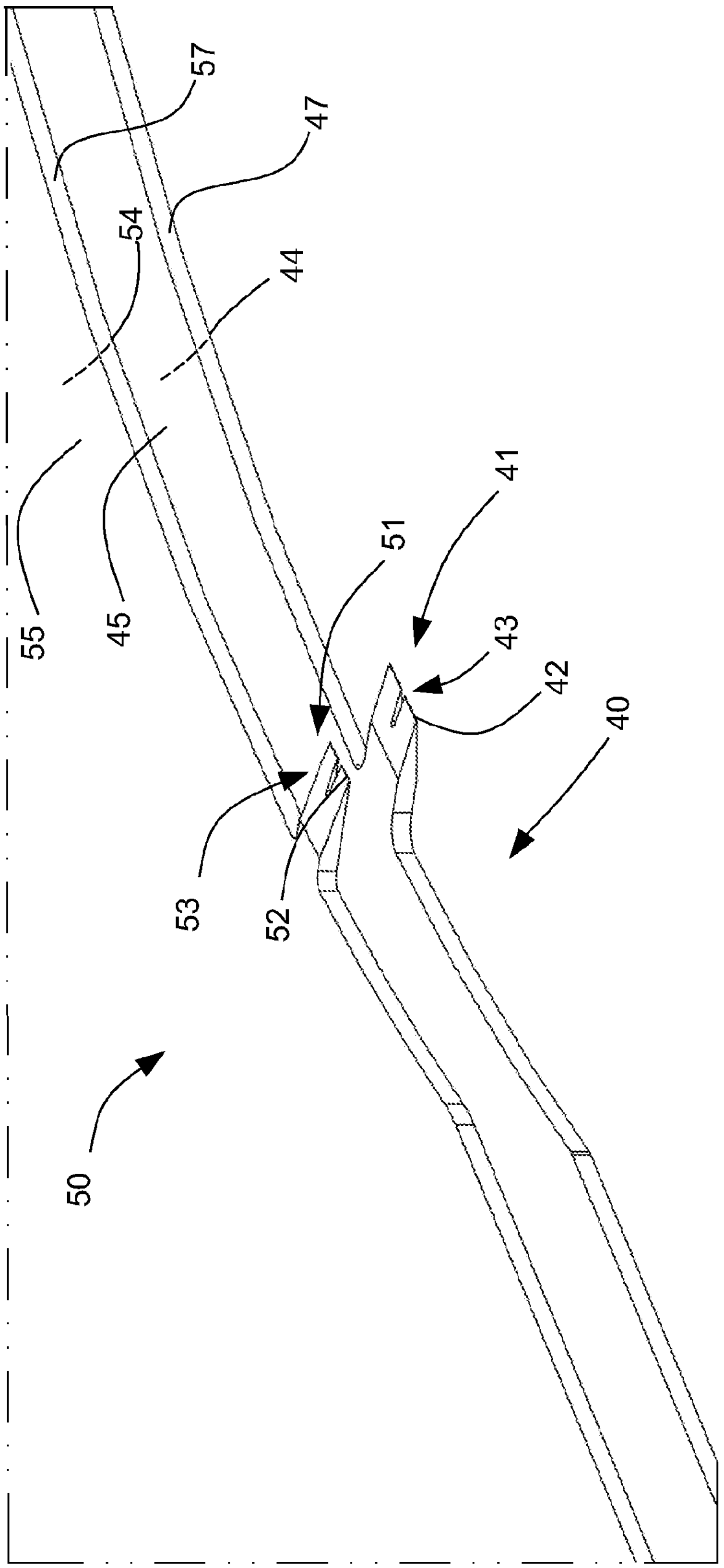
FIG. 12 is a detail of FIG. 10, showing the fourth cutting tool and the fifth cutting tool.

With reference to FIG. 12, the fourth cutting tool 40 has a plate-like structure, parallel to the plane P, and in particular a rectangular base. The fourth cutting tool 40 has two flat faces, substantially parallel to each other, i.e. the fourth lower face 44 and the fourth tipper face 45.

The fourth cutting tool 40, on a fourth peripheral region 47, includes a fourth blade 41. The fourth blade 41 is provided—on a free end thereof—with a fourth cutting edge 42. The fourth cutting edge 42, or at least one point thereof, is located on a fourth substantially circumference arc-shaped curvature, whose centre is located outside the knife 100' on a fourth axis substantially orthogonal to the plane P. The fourth curvature, and thus the fourth cutting edge 42, lies on a fourth plane at a height lower than the first cutting edge 12*a*. The fourth cutting edge 42 has a longitudinal extension smaller than the circumference of the side wall 70 of the capsules to be processed. The fourth cutting tool 40 is arranged to form an accessory groove 75' (FIGS. 9A and 9B) on the side wall 70 of the capsules. The fourth cutting tool 40 cooperates with the fifth cutting tool 54) and the third cutting tool 30' to form the braces 74*a*, 74*b*. The fourth blade 41 may include one or more fourth cavities 43 spaced apart and suitably dimensioned so as not to interrupt the continuity of the material, for example so as not to alter locally or for incising but not perforating the side wall 70 of the capsule, so as to allow to form the bridges 73. In particular, the fourth cutting edge 42 includes only one cavity 43.

Still with reference to FIG. 12, the fifth cutting tool 50 has a plate-like structure, parallel to the plane P, and in particular a rectangular base. The fifth cutting tool 50 has two flat faces, substantially parallel to each other and to the plane P, i.e. the fifth lower face 55 and the fifth upper face 55.

The fifth cutting tool 50, on a fifth peripheral region 57, includes a fifth blade 51. The fifth blade 51 is provided—on a free end thereof—with a fifth cutting edge 52. The fifth cutting edge 52, or at least one point thereof, is located on a fifth substantially circumference arc-shaped curvature, whose centre is located outside the knife 100' on a fifth axis substantially orthogonal to the plane P. The fifth curvature lies on a fifth plane. The fifth cutting edge 52 has an extension smaller than the circumference of the side wall 70 of the capsules to be processed. The fifth cutting tool 50 is arranged to form a further accessory groove 79' (FIGS. 9A and 9B) on the side wall 70 of the capsules. The fifth cutting tool 50 cooperates with the fourth cutting tool 40 and the third cutting tool 30' to form die braces 74*a*, 74*b*.

The fifth blade 51 includes one or more fifth cavities 53 spaced apart and suitably dimensioned so as not to interrupt the continuity of the material, for example so as not to alter locally or for incising but not perforating the side wall 70 of the capsule, so as to allow to form the bridges 73. In particular, the fifth cutting edge 51 includes only one cavity 53.

Figure 13:
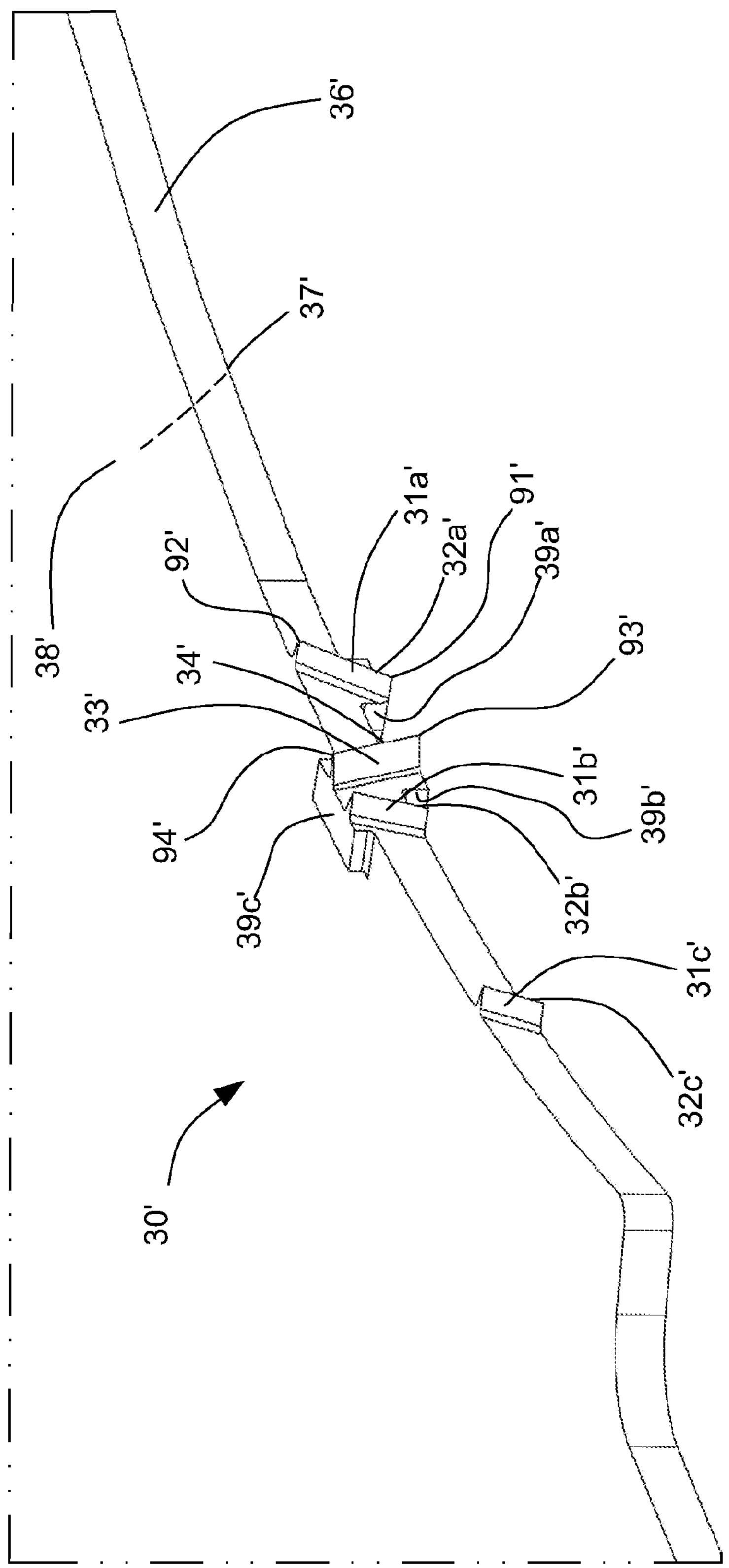
FIG. 13 is a detail of FIG. 10, showing the further third cutting tool.

With reference to FIG. 13, the further third cutting tool 30' has a structure similar to that of the third cutting, tool 30 described previously, which will not be repeated for the sake of brevity. Thus, the parts similar—in terms of shape and function—are indicated with the same reference numerals in the drawings. The difference between the further third cutting tool 30' and the third cutting tool 30 is in the arrangement of further third blades with negative tilt 31*a*', 31*b*' and of a further third blade with positive tilt 33'. As a matter of fact, as will be described in detail hereinafter, the end of third cutting edges with negative tilt 32*a*', 32*b*' and end of third cutting edges with positive tilt 34' may be spaced apart by an amount approximately equal to that of the extension along the advancement direction T of the fourth cutting edges 42 and/or of the fifth cutting edges 52.

The third cutting tool 30' is arranged to perform oblique cuts on the side wall 70. In a peripheral region 36' thereof, the third cutting tool 30 includes one or more third tilted blades 31*a*', 31*b*', 31*c*', 33' provided with respective tilted cutting edges 32*a*', 32*b*', 32*c*', 34'. At least two tilted cutting edges 32*a*', 34' have an tilt different from each other, with reference to a reference plane passing through the vertical axis Z and tangent to the advancement direction T.

In particular, the tilted cutting edge 32*a*' has a negative tilt and the tilted cutting edge 34' has a positive tilt. The negative tilt corresponds to a cutting edge having an upper end thereof receded with respect to a lower end thereof along said advancement direction T and, vice versa, said positive tilt corresponds to a cutting edge having an upper end thereof which is advanced with respect to a lower end thereof along said advancement direction T. As a matter of fact, the tilted cutting edge 32*a*' includes an upper end 92' thereof and a lower end 91' thereof and—considering the advancement direction T—the upper end 92' is receded with respect to the lower end 91', thus the tilted cutting edge 32*a*' has negative tilt. Similarly, the tilted cutting edge 34' includes an upper end 94 thereof and a lower end 93 thereof and—considering the advancement direction T—the upper end 94' is more advanced with respect to the lower end 93', thus the tilted cutting edge 34' has a positive tilt.

Similarly to the tilted cutting edge 32*a*, the tilted cutting edge 32*a*' extends below the height of the third lower face 37' and it is supported by a support protrusion 39*a*~. Even the tilted cutting edge 34' extends below the height of the third lower face 37' and it is supported by a further support protrusion 39*b*' Furthermore, the tilted cutting edge 34' extends even above the height of the third upper face 38', supported by a support protuberance 39*c* which projects from the third upper face 38' superimposed thereto.

Figure 11:
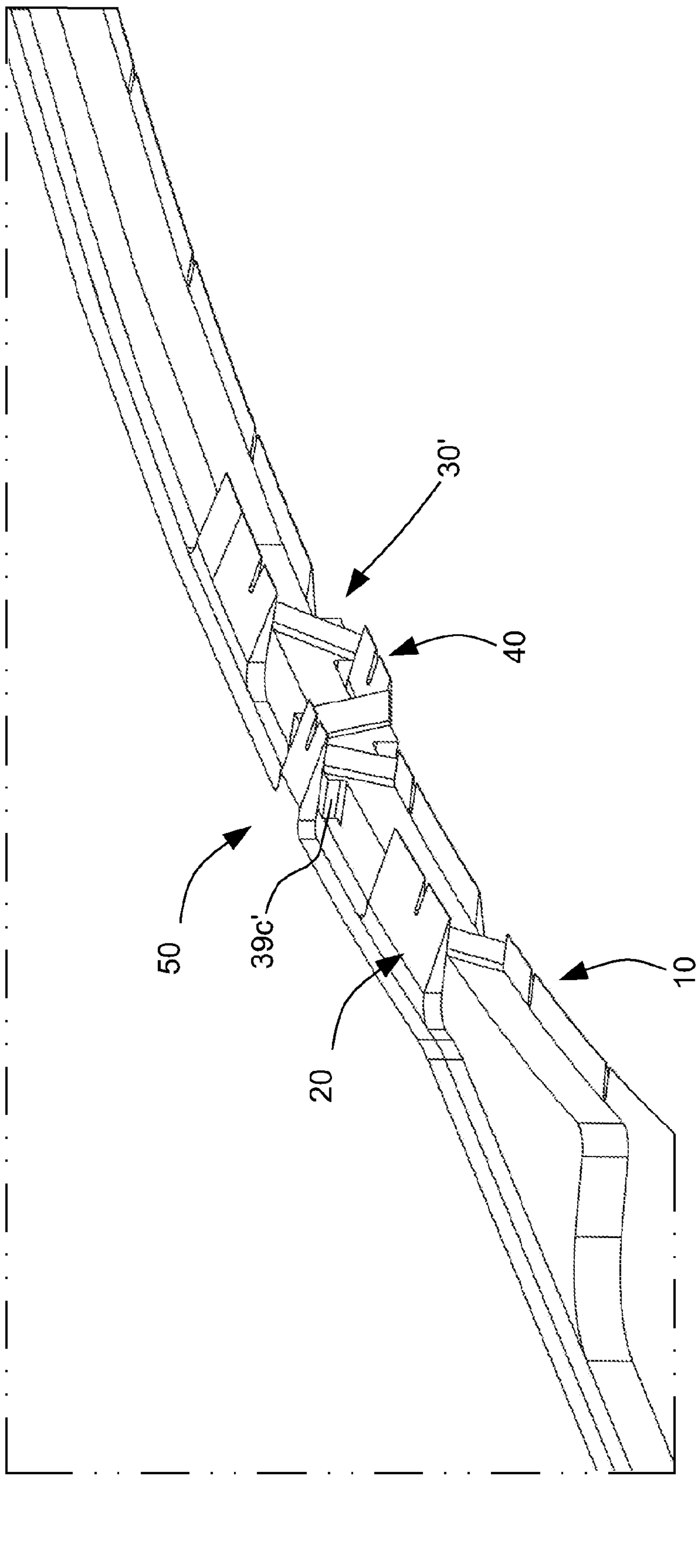
FIG. 11 is a detail of FIG. 10, showing the first cutting tool, the second cutting tool, a further third cutting tool, a fourth cutting tool and a fifth cutting tool.

The fifth blade 51 thus rests on the support protuberance 39*c*', as shown in FIG. 11. The support protuberance 39*c*' can be received in one or more second recesses 26 of the second cutting tool 20. The third tilted cutting edge 32*b*~ is obtained on the respective tilted blade 31*b*', that extends above the third upper face 38' and it is supported by a respective projection, that projects from the third upper face 38' above said third upper face 38'. The projection can be obtained in the support protuberance 39*c*', for example it can be a sole body with the support protuberance 39*c'*.

The aforementioned projections and protrusions are housed in the recesses of the first and second cutting tool similar to those provided for in the version of the knife 100.

With reference to FIGS. 10 and 11, an assembly configuration of the knife 100' provides for the interposition of the third cutting tool 30' between the first cutting tool 10 and the second cutting tool 20, and between the fourth cutting tool 40 and the fifth cutting tool 50 as described hereinafter.

In such assembly configuration of the knife 100'

- the fifth lower face 54 is at contact with the second upper face 25;
- the second lower face 24 is at contact with the third upper face 38';
- the third lower face 37' is at contact with the first upper face 15;
- the first lower face 14 is at contact with the fourth upper face 45.

Furthermore, in such assembly configuration of the knife 100:

- the first axis of the first curvature defined by the first cutting edges 12*a*, 12*b*, 12*c* of the first cutting tool 10,
- the second axis of the first curvature defined by the second cutting edges 21*a*, 21*b* of the second cutting tool 20,
- the third axis of the third curvature defined by the peripheral region 36' of the third cutting tool 30'
- the fourth axis of the fourth curvature on which at least one point of the fourth cutting edge 42 is located, and
- the fifth axis of the fifth curvature on which at least one point of the fifth cutting edge 52 is located, are substantially coincident with each other.

Furthermore, in this assembly configuration the knife 100', the relative position between: the first blades 11*a*, 11*b*, 11*c*, the second blades 21*a*, 21*b*, the third blades with negative tilt 31*a*', 31*b*', 31*c*', the third blades with positive tilt 33' and possible third orthogonal blades define an arrangement of cutting edges 60' of the knife 100'.

Figure 8:
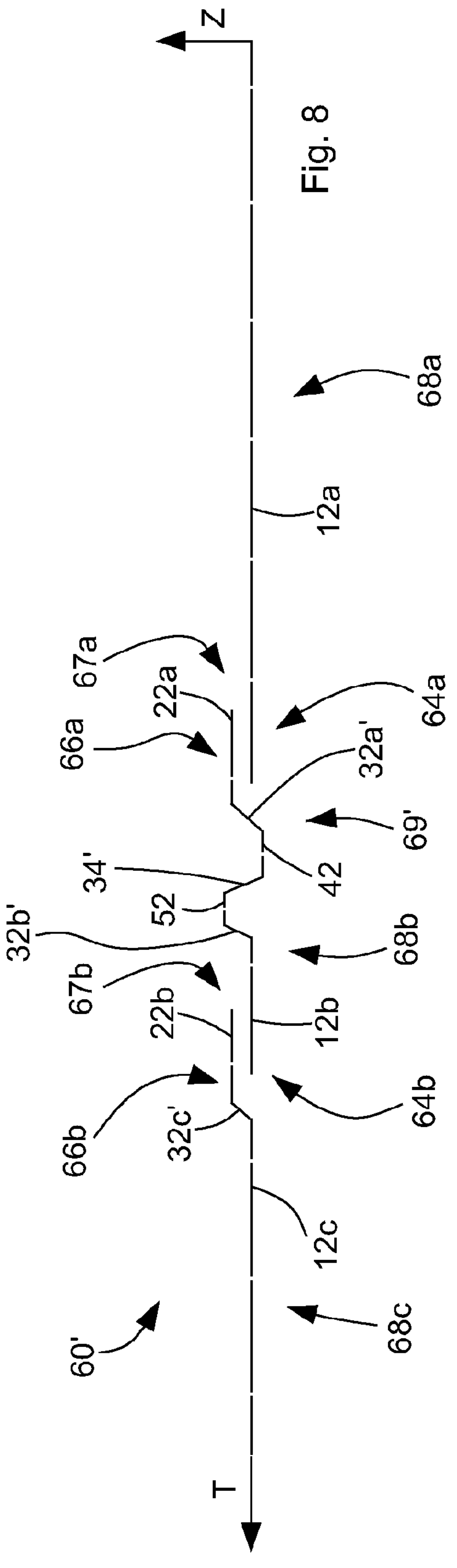
FIG. 8 is a schematic view of an arrangement of blades of a knife according to a second embodiment.

With reference to FIG. 8, the arrangement of cutting edges 60' of the knife 100' is defined by:

- the first cutting edges 12*a*, 12*b*, 12*c* lying on a first plane parallel to the plane P;
- the second cutting edges 22*a*, 22*b* lying on the second plane parallel to the first plane;
- the further third cutting edges with negative tilt 32*a*', 32*b*', 32*c*' and the third cutting edge with positive tilt 34' arranged in an oblique fashion with respect to the plane P and/or possible third cutting edges orthogonal to the plane P;
- the fourth cutting edge 42 lying on the fourth plane parallel to the plane P;
- the fifth cutting edge 52 lying on the fifth plane parallel to the plane P.

The ends of the third cutting edges with negative tilt 32*a*', 32*b*', 32*c*' and the ends of the third cutting edges with positive tilt 34' are positioned close to or at contact with the ends of other cutting edges, as for example in proximity of or at contact with the ends of the cutting edges 12*a*, 12*b*, 12*c* and/or the ends of the cutting edges 22*a*, 22*b* and/or the ends of the third cutting edges with negative tilt 32*a*', 32*b*, 32*c*', and the ends of the third cutting edges with positive tilt 34' and/or the ends of the fourth cutting edge 42 and/or the ends of the fifth cutting edge 52. In the event that the end of the cutting edges with negative tilt 32*a*', 32*b*' and the ends of the third cutting edges with positive tilt 34' be positioned in proximity of the other ends of the cutting edges there are identified third cavities spaced apart and suitably dimensioned so as not to interrupt the continuity of the material, for example so as not to alter or for incising but not perforating the side wall 70 of the capsule, so as to allow to form the bridges.

With reference to FIGS. 9A and 9B, depending on the relative position between the cutting edges of the cutting tools, the knife 100' forms—on the side wall 70 of the capsule 7—an arrangement of oblique cuts 79' which may be different from the one illustrated, which is obtained by the penetration of the third blades with negative tilt 31*a*', 31*b*' and of the third blades with positive tilt 33', of the fourth blade 41 and of the fifth blade 51.

In detail, with reference to FIGS. 8, 9A, 9B and 10, following the path along the advancement direction T, the knife 100' includes:

- an accessory central part 69' The accessory central part 69' includes the fourth cutting edge 42, the third cutting edge with positive tilt 34', the fifth cutting edge 52 and the third cutting edge with negative tilt 32*b*', in which the final end of the third cutting edge with negative tilt 32*a*' ends at a height which may be equal to or lower than that of the plane parallel to the first plane P on which the first cutting edge 12*a* lies. The initial end of the fourth cutting edge 42 lying on the fourth plane, i.e. at a height lower than that of plane P is located at the final end of the third cutting edge with negative tilt 32*a*'. The final end of the fourth cutting edge 42 is located at, or at contact with, the initial end of the third cutting edge with a positive tilt 34' tilted or in a vertical arrangement. The third cutting edge with positive tilt 34' ends at a height that can be equal to or higher than that of the second plane on which the second cutting edge 22*a* lies. The final end of the third cutting edge with positive tilt 34' is close to or at contact with the initial end of the fifth cutting edge 52 lying on the fifth plane, i.e. at a height which may be higher than that of the second plane on which the second cutting edge 22*a* lies. The final end of the fifth cutting edge 52 is located at a third cutting edge with negative tilt 32*b*'. The accessory central pan 69' corresponds to a plurality of oblique cuts and flat cuts, in which a flat cut is interposed between two oblique cuts of different tilt on the side wall 70; the plurality of oblique cuts and flat cuts allows to separate the two braces 74*a*, 74*b* from each other. The accessory central part 69' extends for example between 5% and 10% of the length of the knife 100'.

Owing to the shape of the knife 100, 100' it is possible to disassemble the third cutting tool 30; 30' from the layered structure and replace it with a different third cutting tool to obtain a different shape of the connecting portions or braces 74*a*, 74*b*. This simplifies the cutting apparatus and reduces the machine downtimes to equip the cutting apparatus with a different knife. Furthermore, the cutting apparatus also maintains a certain flexibility, given that it is possible to perform cuts with a knife in which a small number of cutting tools is to be replaced in order to change the geometry of the cut on the capsule.

The illustrated examples show a grooved capsule with two braces, both tilted with a negative tilt with respect to the advancement direction T, as can be seen in the open configuration D of the capsule. It is clear that a man skilled in the art would have no difficulty in modifying the number and arrangement of the cutting edges of the knife 100, 100' for cutting capsules with a number of braces greater than two, for example three or four braces, tilted with negative and/or positive tilts according to various combinations.

It is possible to provide for a number and arrangement of the cutting edges, having positive and negative tilts combined to form three tilted braces arranged with the same tilt or a brace with a certain tilt and two consecutive braces with the opposite tilt or three braces with alternating tilts. It is also possible to provide for another different arrangement of the cutting edges, whose combination of positive and negative tilts may form four braces arranged tilted all with the same tilt or in groups of two braces with opposite tilt, or four braces tilted with alternating tilts or three consecutive braces tilted with the same tilt and a brace tilted with the opposite tilt.

In order to obtain three or four connecting portions—or braces—which connect the tamper ring 72 and the side wall 70, besides the two tilted cutting edges 32*a*, 34, 32*a*', 34' in the third cutting tool 30, 30' further cutting edges arranged so as to determine—in use—the three connecting portions or the four connecting portions may be provided for.

Alternatively or additionally to the further cutting edges in the third cutting tool 30, 30', to obtain three connecting portions or four connecting portions, the knife 100, 100' may include—in the plurality of cutting tools of the structure thereof—further cutting tools arranged to cooperate with the first horizontal cutting tool 10, the second horizontal cutting tool 20 and the third cutting tool 30, 30' and, if present, with the additional cutting edges to determine—in use—the three connecting portions or the four connecting portions connecting the tamper ring 72 and the side wall 70.

The invention claimed is:

1. A knife for a cutting apparatus to obtain incision lines and cuts on a capsule made of plastics intended to close a container, said knife being suitable for performing cuts and incisions on a side wall of said capsule when said capsule is around a rotation axis (R) and moved along a path to interact with said knife in an advancement direction, said knife including a plurality of separate cutting tools arranged in a layered structure, in which said cutting tools are parallel to a plane and stacked in the direction of a vertical axis orthogonal to said plane, said layered structure of cutting tools including:

a first horizontal cutting tool arranged for performing circumferential cuts on said side wall at a first height on said vertical axis to define a tamper ring in said capsule;

a second horizontal cutting tool, arranged for performing further circumferential cuts on said side wall at a second height different from said first height on said vertical axis; and a third cutting tool, arranged for performing oblique cuts on said side wall and for defining with said second horizontal cutting tool and with said first horizontal cutting tool connecting portions connecting said tamper ring and said side wall;

wherein said third cutting tool includes at least two tilted cutting edges having a tilt different from each other relative to a reference plane passing through said vertical axis and tangent to said advancement direction of said capsule, said third cutting tool being interposed between said first horizontal cutting tool and said second horizontal cutting tool, whereby said third cutting tool may be disassembled from said layered structure in order to be replaced with a different third cutting tool to obtain a different shape of said connecting portions.

2. The knife according to claim 1, wherein:

said first horizontal cutting tool includes:

a first lower face and a first upper face, said first upper face being shaped to contact said third cutting tool;

a plurality of first blades, provided on a free end thereof with a plurality of first horizontal cutting edges;

said first blades being spaced apart by one or more first recesses.

3. The knife according to claim 1, wherein:

said second horizontal cutting tool includes:

a second lower face and a second upper face, said second lower face being shaped to contact said third cutting tool;

a plurality of second blades, provided on a free end thereof with a plurality of second horizontal cutting edges that extend along a second plane parallel to said plane;

said second blades being spaced apart by one or more second recesses.

4. The knife according to claim 1, wherein said third cutting tool includes a third lower face and a third upper face; said third lower face being shaped to contact said first horizontal cutting tool and said third upper face being shaped to contact said second horizontal cutting tool.

5. The knife according to claim 4, wherein a respective blade on which a tilted cutting edge of said at least two tilted cutting edges is obtained extends below said third lower face and is supported by a respective support protrusion, said support protrusion protruding from said third lower face below said third lower face.

6. The knife according to claim 5, wherein said first horizontal cutting tool includes a first lower face and a first upper face, said first upper face being shaped to contact said third cutting tool and said first horizontal cutting tool further includes a plurality of first blades, provided on a free end thereof with a plurality of first horizontal cutting edges and being spaced apart by one or more first recesses; and wherein said respective support protrusion is shaped to be received in said one or more first recesses.

7. The knife according to claim 4, wherein a respective blade on which a tilted cutting edge of said at least two tilted cutting edges is obtained extends above said third upper face and is supported by a respective support protuberance, said support protuberance protruding from said third upper face above said third upper face.

8. The knife according to claim 7, wherein said second horizontal cutting tool includes a plurality of second blades, provided on a free end thereof with a plurality of second horizontal cutting edges and being spaced apart by one or more second recesses; and wherein said respective support protuberance is received in said one or more second recesses.

9. The knife according to claim 1, wherein said at least two tilted cutting edges have an opposite tilt and include respectively a third cutting edge with a negative tilt and a third cutting edge with a positive tilt, wherein said negative tilt corresponds to a cutting edge having an upper end thereof receded with respect to a lower end thereof along said advancement direction and, vice versa, said positive tilt corresponds to a cutting edge having the upper end thereof advanced with respect to a lower end thereof along said advancement direction.

10. The knife according to claim 9, wherein said third cutting edge with a positive tilt is arranged downstream of said third cutting edge with a negative tilt along said advancement direction.

11. The knife according to claim 1, wherein said third cutting tool further includes in addition to said two tilted cutting edges a further third tilted cutting edge arranged downstream of said two tilted cutting edges along said advancement direction.

12. The knife according to claim 11, wherein said further third tilted cutting edge has a negative tilt in said reference plane, wherein said negative tilt corresponds to a cutting edge having an upper end thereof receded with respect to a lower end thereof along said advancement direction.

13. The knife according to claim 12, wherein said third cutting tool further includes a still further third tilted cutting edge with a negative tilt, arranged downstream of said further third tilted cutting edge with a negative tilt along said advancement direction, wherein said negative tilt corresponds to a cutting edge having an upper end thereof receded with respect to a lower end thereof along said advancement direction.

14. The knife according to claim 11, wherein said third cutting tool includes a third lower face and a third upper face; said third lower face being shaped to contact said first horizontal cutting tool and said third upper face being shaped to contact said second horizontal cutting tool; and wherein said further third tilted cutting edge is obtained on a respective tilted blade that extends above said third upper face and is supported by a respective projection, that projects from said third upper face above said third upper face.

15. The knife according to claim 14, wherein a respective blade on which a tilted cutting edge of said at least two tilted cutting edges is obtained extends above said third upper face and is supported by a respective support protuberance, said support protuberance protruding from said third upper face above said third upper face; and wherein said projection is obtained in said support protuberance.

16. The knife according to claim 1, wherein said at least two tilted cutting edges include respective lower ends and/or respective upper ends arranged at a preset distance to form a bridge made of plastic material between the respective oblique cuts that said tilted cutting edges perform in said side wall.

17. The knife according to claim 1, wherein said at least two tilted cutting edges include respective lower ends arranged at a preset distance, a further blade of a further cutting tool of said layered structure being interposed between said respective lower ends.

18. The knife according to claim 1, wherein said plurality of cutting tools arranged in said layered structure further includes a fourth horizontal cutting tool, arranged below said first horizontal cutting tool to perform further circumferential cuts on said side wall at a height below said first height on said vertical axis.

19. The knife according to claim 18, wherein said plurality of cutting tools arranged in said layered structure further includes a fourth horizontal cutting tool, arranged below said first horizontal cutting tool to perform further circumferential cuts on said side wall at a height below said first height on said vertical axis; and wherein:

said fourth horizontal cutting tool, includes:

a lower fourth face and a fourth upper face, said fourth upper face being shaped to contact said first horizontal cutting tool; and a fourth blade provided on a free end thereof with a fourth horizontal cutting edge; said fourth blade being said further blade.

20. The knife according to claim 1, wherein said plurality of cutting tools arranged in said layered structure further includes a fifth horizontal cutting tool, arranged above said second horizontal cutting tool to perform further circumferential cuts on said side wall at a height above said second height on said vertical axis.

21. The knife according to claim 20, wherein a respective blade on which a tilted cutting edge of said at least two tilted cutting edges is obtained extends above said third upper face and is supported by a respective support protuberance, said support protuberance protruding from said third upper face above said third upper face; and wherein:

said fifth cutting tool includes:

a fifth lower face and a fifth upper face, said fifth lower face being shaped to contact said second horizontal cutting tool; and a fifth blade provided on a free end thereof with a fifth cutting edge;

said fifth blade resting on said support protuberance.

22. The knife according to claim 1, wherein said third cutting tool includes in addition to said at least two tilted cutting edges further cutting edges arranged so as to determine in use three connecting portions or four connecting portions connecting said tamper ring and said side wall.

23. The knife according to claim 1, wherein said plurality of cutting tools of said structure further includes additional cutting tools arranged for cooperating with said first horizontal cutting tool, said second horizontal cutting tool, and said third cutting tool and, if present, with said additional cutting edges to determine in use three connecting portions or four connecting portions connecting said tamper ring and said side wall.

* * * * *